(12) United States Patent
Bereciartua-Perez et al.

(10) Patent No.: US 12,450,862 B2
(45) Date of Patent: Oct. 21, 2025

(54) QUANTIFYING BIOTIC DAMAGE ON PLANT LEAVES, BY CONVOLUTIONAL NEURAL NETWORKS

(71) Applicant: BASF SE, Ludwigshafen am Rhein (DE)

(72) Inventors: Aranzazu Bereciartua-Perez, Derio (ES); Artzai Picon Ruiz, Derio (ES); Corinna Maria Spangler, Ludwigshafen (DE); Christian Klukas, Limburgerhof (DE); Till Eggers, Ludwigshafen (DE); Jone Echazarra Huguet, Derio (ES); Ramon Navarra-Mestre, Limburgerhof (DE)

(73) Assignee: BASF SE, Ludwigshafen am Rhein (DE)

( * ) Notice: Subject to any disclaimer, the term of this patent is extended or adjusted under 35 U.S.C. 154(b) by 524 days.

(21) Appl. No.: 17/910,045

(22) PCT Filed: Mar. 15, 2021

(86) PCT No.: PCT/EP2021/056503
§ 371 (c)(1),
(2) Date: Sep. 8, 2022

(87) PCT Pub. No.: WO2021/185745
PCT Pub. Date: Sep. 23, 2021

(65) Prior Publication Data
US 2023/0100268 A1 Mar. 30, 2023

(30) Foreign Application Priority Data
Mar. 16, 2020 (EP) .................................... 20163426

(51) Int. Cl.
*G06V 10/25* (2022.01)
*G06N 3/0464* (2023.01)
(Continued)

(52) U.S. Cl.
CPC ........... *G06V 10/26* (2022.01); *G06N 3/0464* (2023.01); *G06N 3/08* (2013.01); *G06V 10/454* (2022.01); *G06V 10/82* (2022.01); *G06V 20/188* (2022.01)

(58) Field of Classification Search
CPC ....... G06V 10/26; G06V 10/454; G06V 10/82; G06V 20/188; G06N 3/0464; G06N 3/08; G06N 3/045
(Continued)

(56) References Cited

PUBLICATIONS

Abdul Waheed, Muskan Goyal, Deepak Gupta, Ashish Khanna, Aboul Ella Hassanien, Hari Mohan Pandey, An optimized dense convolutional neural network model for disease recognition and classification in corn leaf, Computers and Electronics in Agriculture, vol. 175, 2020, 105456, ISSN 0168-1699 (Year: 2020).*

(Continued)

*Primary Examiner* — Charlotte M Baker
(74) *Attorney, Agent, or Firm* — ArentFox Schiff LLP

(57) ABSTRACT

To quantify biotic damage in leaves of crop plants, a computer receives (701A) a leaf-image taken from a particular crop plant. The leaf-image shows at least one of the leaves of the particular crop plant. Using a first convolutional neural network (CNN, 262), the computer processes the leaf-image to derive a segmented leaf-image (422) being a contiguous set of pixels that show a main leaf of the particular plant completely. The first CNN has been trained by a plurality of leaf-annotated leaf-images (601A), wherein the leaf-images are annotated to identify main leaves (461). Using a second CNN (272), the computer processes the single-leaf-image by regression to obtain a damage degree (432).

20 Claims, 11 Drawing Sheets

(51) Int. Cl.
  *G06N 3/08*     (2023.01)
  *G06V 10/26*    (2022.01)
  *G06V 10/44*    (2022.01)
  *G06V 10/82*    (2022.01)
  *G06V 20/10*    (2022.01)

(58) Field of Classification Search
  USPC .......................................................... 382/110
  See application file for complete search history.

(56) References Cited

PUBLICATIONS

International Search Report and Written Opinion of International Application No. PCT/EP2021/056503 mailed May 18, 2021, 10 pgs.
Hitimana et al., "Automatic Estimation of Live Coffee Leaf Infection Based on Image Processing Techniques", Computer Science & Information Technology, Feb. 21, 2014, pp. 255-266.
Wu et al., "Crop Organ Segmentation and Disease Identification Based on Weakly Supervised Deep Neural Network", Agronomy, Nov. 1, 2019, vol. 9, No. 11, 21 pgs.
European Search Report for EP20163426.8 dated Oct. 6, 2020, 8 pgs.
Ronneberger et al., "U-Net: Convolutional Networks for Biomedical Image Segmentation", Computer Science Department and BIOSS Centre for Biological Signalling Studies, University of Freiburg, Germany, Springer International Publishing Switzerland, 8 pgs.
Huang, et al., "Densely Connected Convolutional Networks", 2017 IEEE Conference on Computer Vision and Pattern Recognition, Aug. 26, 2022, pp. 2261-2269.

* cited by examiner

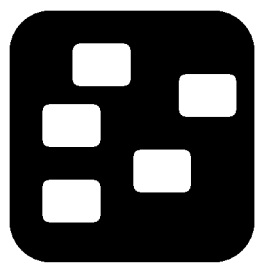
431
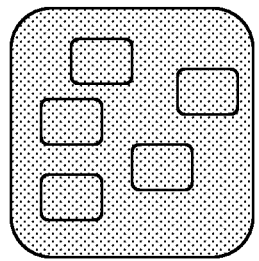
421
FIG. 9

QUANTIFYING BIOTIC DAMAGE ON PLANT LEAVES, BY CONVOLUTIONAL NEURAL NETWORKS

CROSS-REFERENCE TO RELATED APPLICATIONS

This application is a national stage entry under 35 U.S.C. § 371 of International Application No. PCT/EP2021/056503, filed on Mar. 15, 2021, which claims the benefit of priority of European Application No. 20163426.8, filed on Mar. 16, 2020, the disclosures of which are hereby incorporated by reference herein in their entireties.

TECHNICAL FIELD

The disclosure generally relates to image processing by computers, and more in particular relates to techniques for quantifying biotic damage on plant leaves.

BACKGROUND

Crop plants are plants to be consumed by humans (or by animals). Damage to the plants—especially biotic damage—should be minimized. This is especially relevant while the crop plant is still growing on the agricultural field. Quantifying the damage is a precondition for the farmer to apply a suitable measure that limits the damage.

More in detail, experts in plant pathology are familiar with diseases in plants caused by pathogens (infectious organisms) and environmental conditions (physiological factors). Much simplified and to point out only one aspect of many aspects: as the plants have leaves, biotic damage can be estimated by visually inspecting the plant leaves.

Damage can have different reasons. For example, feeding damage is damage by pest animals (among them some insect species) that eat parts of the leaves. Bacteria damage or fungi damage are examples of damage in the cellular structure of the leaf. The overall term "necrosis" for cell damage is just mentioned.

Damage changes the visual appearance of the leaves, usually in their color. Feeding damage is visible as insects sitting on the leaves, or as holes or cut-away parts of the leaves. Structural changes can change the color of the leaves, at least partially. There might be other, more complex reasons. For example, a mouse may eat from the root so that the leaves lose their "green" color.

The farmers can apply a suitable pest control measure or other countermeasure: such as applying specific chemicals (such as, for example, insecticides, bactericides, fungicides). The efficiency of the measures is related to the quantity of the damage, to the quantity of the chemicals, as well as to the accuracy and the time it takes to quantify the damage. However, different farmers may quantify damage differently.

In quantifying the damage, the farmers can operate cameras (in mobile devices and the like) to take leaf-images. Image processing tools play an important role in assisting the farmers.

However, real-world conditions to take leaf-images are typically far away from optimal: in real field conditions, the farmers may take the images, for example, by non-focused smartphones under poor illumination.

While the conditions are difficult to change, there is a task for the image processing tools to compensate for such and other insufficiencies. In other words, there is a desire to estimate damage as objective as possible and as repeatable as possible.

Yang Wu et al: Crop Organ Segmentation and Disease Identification Based on Weakly Supervised Deep Neural Network. AGRONOMY, vol. 9, no. 11, 1 Nov. 2019, page 737 explains the use of a convolutional neural network to recognize diseases in tomato leaves. To prepare the input for the CNN, leaves are identified by manually adding image annotations in form of rectangles, in combination with subsequently applying color processing within the rectangles. Then, the CNN classifies the disease. There is no quantization.

Eric Hitimana et al: Automatic Estimation of Live Coffee Leaf Infection Based on Image Processing Techniques, COMPUTER SCIENCE & INFORMATION TECHNOLOGY (CS& IT), 21 Feb. 2014, pages 255-266 explains a two-step approach to estimate damages, with the first step to remove background from the image and the second step to estimate the severity of the damage. Classical image processing techniques are used for both steps.

SUMMARY

According to embodiments of the present invention, a computer is adapted to quantify biotic damage in the leaves of crop plants. The computer performs a computer-implemented method that comprises to receive leaf-images and to provide damage quantity indicators. The computer provides the indicators as damage degrees. Since the computer uses machine learning tools, it performs the method during a so-called testing phase (or so-called production phase).

By using these indicators, the farmer can apply the measures accordingly.

The computer quantifies damage for the leaves of the plants as damage-per-leaf. The damage-per-leaf is a numeric value that assists the farmer to apply the measures accordingly.

Since the leaf-image shows a foreground leaf together with other leaves or with other objects, the computer cannot derive the damage-per-leaf from the leaf-image directly. Processing is therefore distinguished for subsequently performed step sequences. In the first sequence, the computer segments the leaf-image to a single-leaf-image. In other words, the single-leaf-image is the leaf-image in that the foreground leaf remains and from that the other leaves or objects have been removed. In the second sequence, the computer obtains the damage-per-leaf from the single-leaf-image.

Generally, the computer uses Machine Learning (ML) techniques, and more in particular, the computer performs both step sequences by two separately trained convolutional neural networks (CNNs). A first CNN performs the first sequence, and a second CNN performs the second sequence. Since the CNNs each have multiple layers, the ML can be regarded as "deep learning".

As images are pixels sets, the first CNN provides the single-leaf-image as a contiguous sub-set of pixels showing a particular foreground leaf only. The first CNN derives the single-leaf-image from the leaf-image by a separation technique (or delimiting technique, or segmenting technique). The second CNN processes the single-leaf-image to obtain the damage degree. This damage-per-leaf indicator is calculated as the ratio between the surface of a damage region on the leaf in relation to the surface of the leaf. The surface of the leaf is related to the number of pixels that represent the leaf (with the resolution of the camera being a factor).

Therefore, the ratio can also be obtained as a pixel ratio (e.g., the number of pixels that correspond to damage and the number of pixels that correspond to the leaf).

In addition to the damage ratio, the damage could be quantified otherwise, such as by the number of damage dots, or by the number of damage dot clusters.

The second CNN can operate according to two alternatives of the second sequence.

In the first alternative, the second CNN uses regression to obtain the damage degree as the result. In the second alternative, the second CNN provides a binary-image as intermediate result, wherein the binary-image has a countable number of pixels that show damage, and wherein the single-leaf-image has a countable number of pixels that show the foreground leaf.

As a condition, the computer has been trained with training data sets. Appropriate training is available for both CNNs.

The first CNN is trained with human-annotated images that are leaf-annotated leaf-images (i.e., images that show the foreground leaf, with annotations that identify the foreground leaf over the rest of the image).

The second CNN is trained separately for the alternatives.

For the first alternative, the second CNN is trained with damage annotations (i.e., human expert users indicate the damage in terms of the ratio). The damage annotations do not identify which pixels show damage and which pixels do not.

For the second alternative, annotations from human users are not available. There is a simple reason for that: damage regions may be too small for the expert to make correct annotations. Instead, for the second alternative, the second CNN is trained with (a plurality of) image pairs as input. An image pair comprises a single-leaf-image and a binary-image. For each pair, the binary-image has been derived by color-processing from the respective single-leaf image. While the single-leaf-images are color images, a color-processing tool modifies the color-coding such that the binary-images have pixels that identify damage regions and have pixels that identify leaf regions.

During training, the second CNN (second alternative) receives the pairs and learns how to arrive from the color-coded single-leaf-images to the binary-images. The second CNN thereby obtains weights and other parameters for the network model, but the second CNN does not apply color-processing.

During the testing phase, the second CNN in the first alternative uses the mentioned regression to obtain the damage degree. The second CNN in the second alternative provides the binary-image as intermediate result, and a further counter obtains the damage degree by counting pixels.

BRIEF DESCRIPTION OF THE DRAWINGS

FIG. 9 illustrates that the computer changes the color-coding of a single-leaf-image and arrives at a binary-image;

DETAILED DESCRIPTION

Structure

Figure 1:
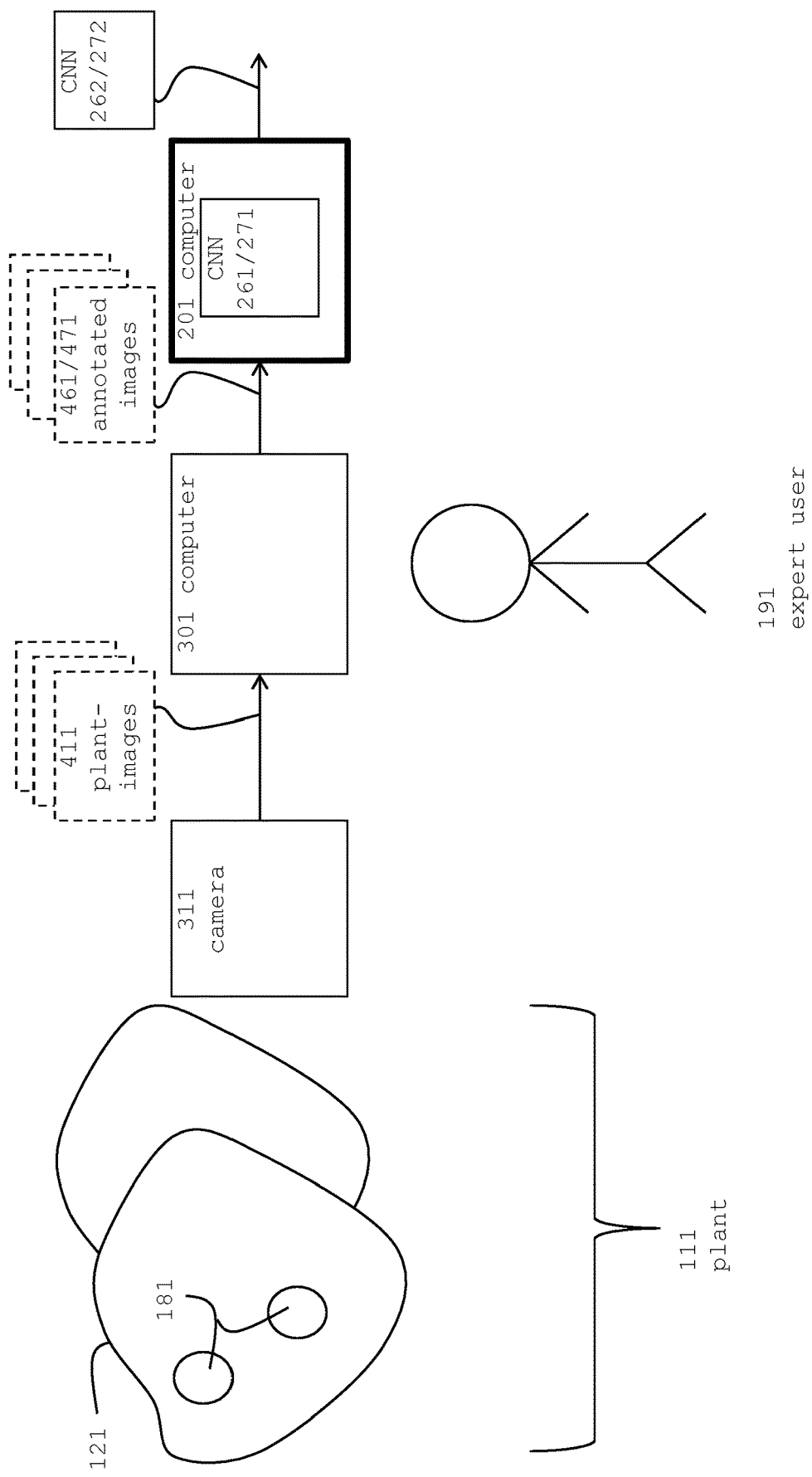
FIG. 1 illustrates an overview to a computer-implemented approach to teach—in a training phase—convolutional neural networks (CNN) to quantify biotic damage in leaves of crop plants.
Figure 2:
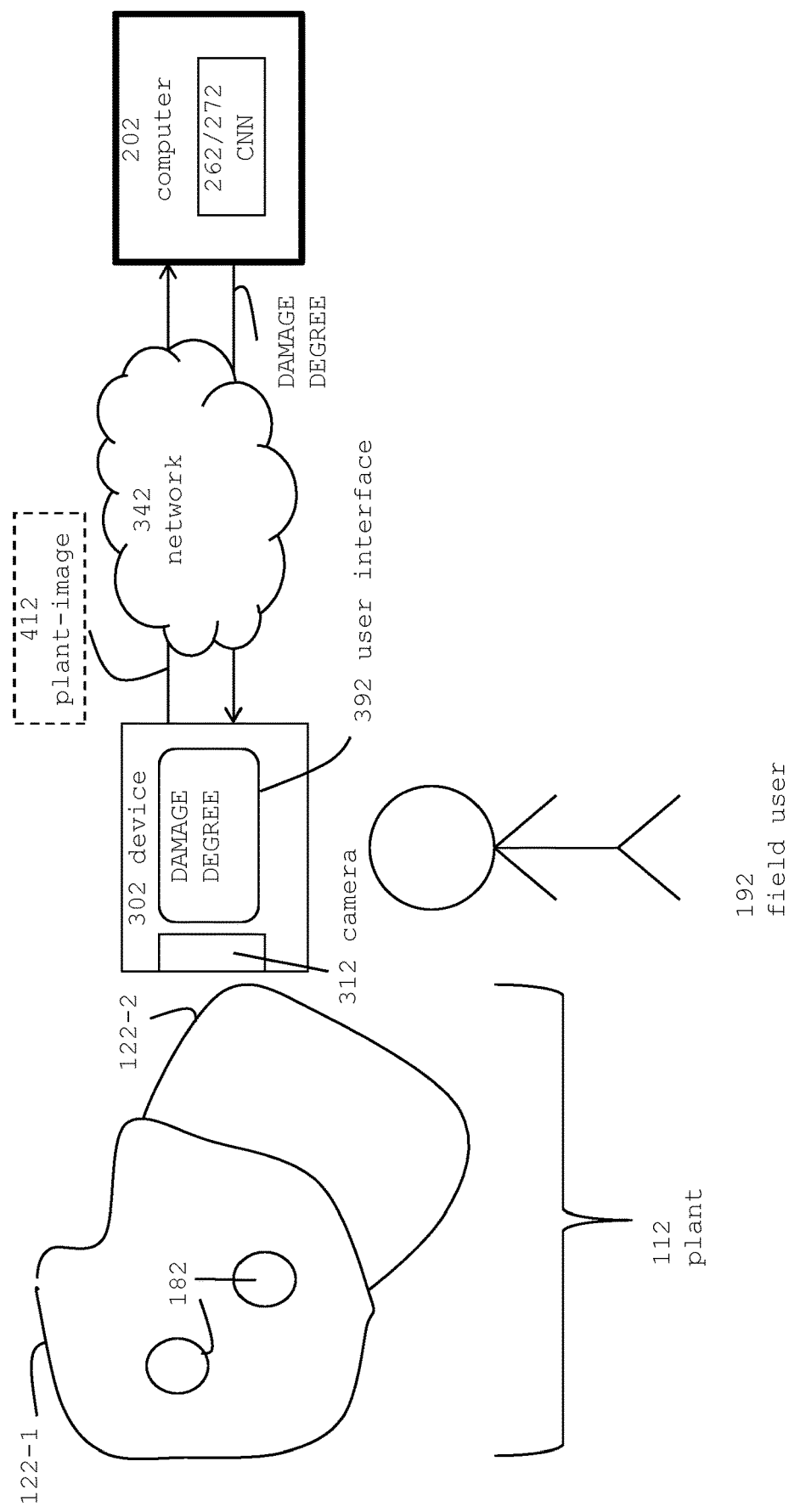
FIG. 2 illustrates an overview to a computer-implemented approach to quantify biotic damage of plant leaves in a testing phase.
Figure 3:
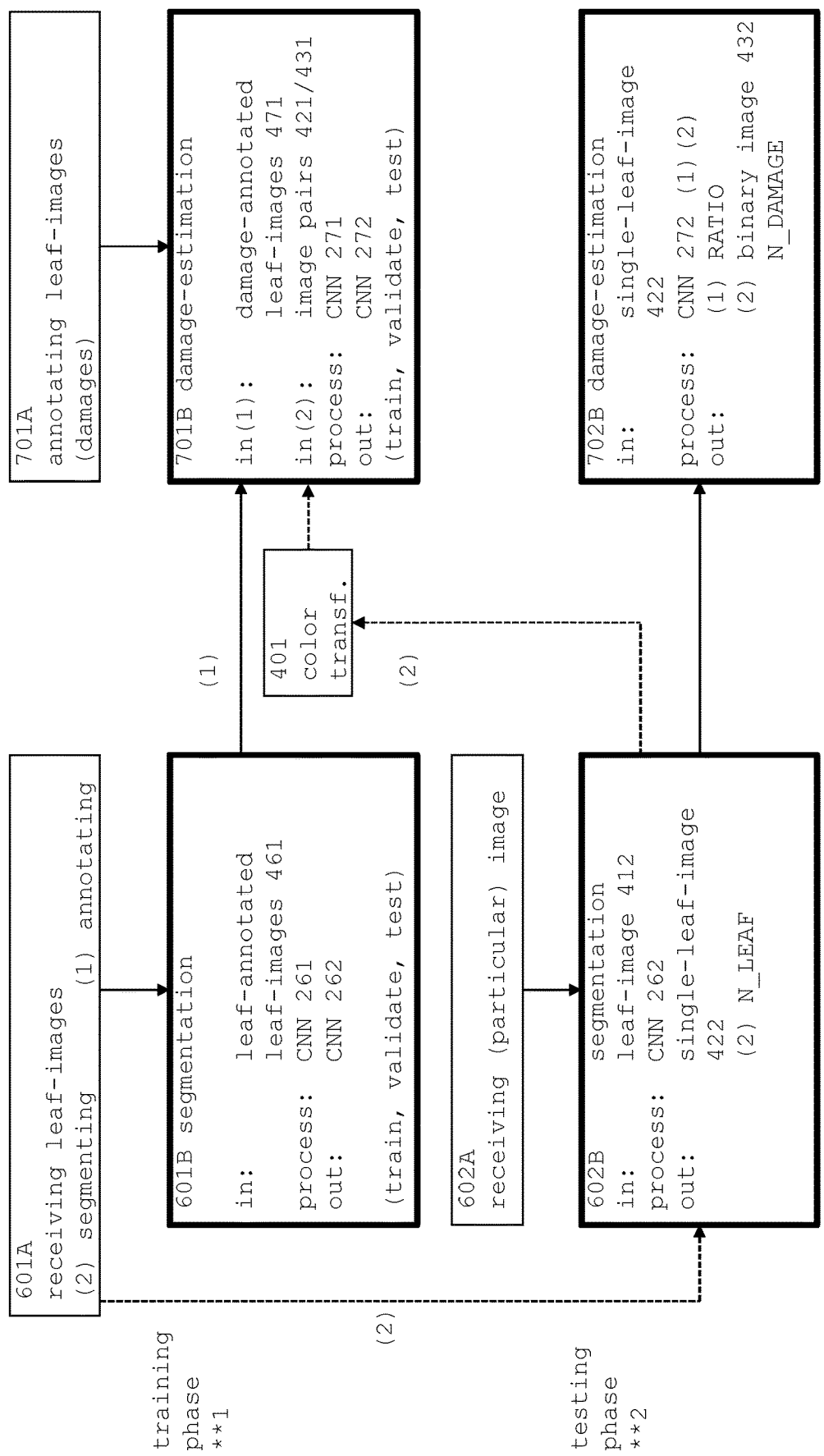
FIG. 3 illustrates an overview to computer-implemented methods.
Figure 10:
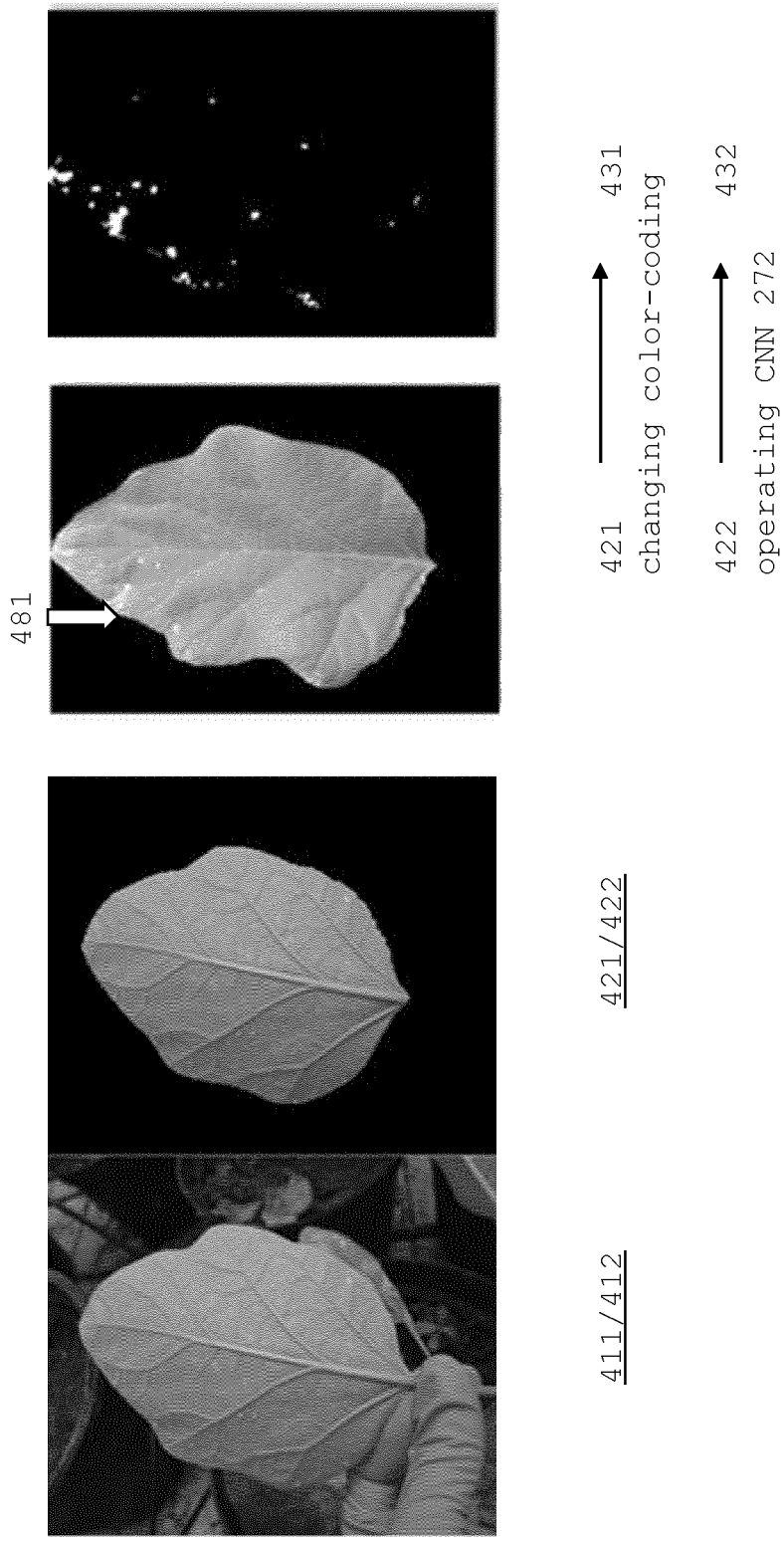
FIG. 10 illustrates several gray-scale photographs with real images.

The description starts by explaining writing conventions and introduces step sequences from a high-level perspective by differentiating a training phase and a testing phase (FIGS. 1-3). The description then discusses plants, leaves and images with more detail (FIGS. 4-6), discusses details for the CNNs (FIG. 7), and introduce image processing by color transformation that is an auxiliary process to train the second CNN in the second alternative (FIG. 8-10).

The term "image" stands for the data-structure of a digital photograph (i.e., a data-structure using a file format such as JPEG, TIFF, BMP, RAW or the like). Phrases like "the camera takes an image" stand for a camera with a viewing angle to capture an object (such as a plant) and letting the camera store the image.

The description uses the term "show" when it explains the content of images (i.e., the semantics), for example in phrases such as "the image shows a plant". There is however no need that a human user looks at the image. The description expresses computer-user interactions with the user looking at the image by the term "display", such as in "the computer displays a numeric value" or the like.

The term "annotation" stands for meta-data that a computer receives when an expert user looks at the display of an image and interacts with the computer. The term "annotated image" indicates the availability of such meta-data for an image (or for a sub-region of that image), but there is no need to store the meta-data and the image in the same data-structure. The annotations are meta-data and there is no need to embed them into the data-structure of the image.

The term "area" identifies the quantity of a surface of a plant (in terms of square meters, or square pixels). The description occasionally writes colors in quotation marks, such as for "green" leaves, indicating that nature offers many different color shades.

For convenience, the description refers to hardware components (such as computers, cameras, mobile devices, communication networks) in singular terms. However, implementations can use multiple components. For example, "the camera taking a plurality of images" comprises scenarios in that multiple cameras participate so that some images are taken from a first camera, some images are taken from a second camera and so on.

Overview to Training and Testing Phases

FIGS. 1-3 illustrate overviews to computer-implemented approaches, to train convolutional neural networks (CNN) to quantify biotic damage in leaves of crop plants in a training phase 1, and to use the trained CNNs to quantify damage during a (subsequent) testing phase 2.

Throughout most of this description, references noted as 1/2 stand for elements that are similar but that have different use in both phases.

From left to right, FIGS. 1-2 illustrate plants 111/112 (with leaves and with damage regions 181/182), cameras 311/312 to take leaf-images 411/412, and computers 201/202 with CNNs. The figures also illustrate human users 191/192. FIGS. 1-2 illustrate computers 201/202 by rectangles with bold frames.

FIGS. 1-2 also illustrate computer 301 and mobile device 302, performing auxiliary activities (or participating therein), such as taking images, transmitting images, receiving annotations, forwarding results to other computers, displaying damage degrees to users etc.

As in FIG. 3, computers 201/202 implement step sequences 601B, 602B, 701B and 702B. Sequence 701B (training to obtain damage degree) has two alternatives
(1) train CNN 271 to perform regression, and
(2) train CNN 271 to perform damage segmentation.

Some of the auxiliary activities are pre-processing activities that prepare method executions. FIG. 3 illustrates the pre-processing activities by references 601A, 602A, and 701A.

Computers 201/202 use CNNs and other modules (such as user interfaces). While FIGS. 1-2 just introduce the CNNs, the other figures provide details for pre-processing images and for setting parameters to the CNNs. CNNs 261 and 271 are being trained in the training phase **1 to become trained CNNs 262 and 272, respectively. In other words, the difference between untrained and trained CNNs is the availability of parameters obtained through training.

FIG. 3 illustrates an activity flowchart in matrix notation. The figure continues to use bold lines to illustrate step sequences that are performed by the CNNs.

The description explains the activities separately for training phase 1 (in the row above) and for testing phase 2 (in the row below). FIG. 3 differentiates pre-processing activities 601A, 602A and 701A (such as taking/receiving images and annotating images) and intermediate processing 401 from computer-implemented step sequences 601B, 602B, 701B, and 702B with machine-learning techniques.

Sequences 601B and 602B are performed with CNNs 261/262, and sequences 701B and 702B are performed with CNNs 271/272. CNNs 261/262 and CNNs 271/272 differ from each other by parameters and by function.

Training Phase with Alternative (1)

As in box 601A, training phase **1 alternative (1) starts by computer 301 receiving leaf-images 411 (from camera 311). In interaction with expert user 191, computer 301 further receives annotations that indicate the edges of the leaves on the images (so-called leaf-annotations). Computer 301 receives leaf-images 411 and receives annotations 451 (cf. FIG. 4) for a plurality of images, to obtain a plurality of leaf-annotated leaf-images 461. This first plurality is the segmentation training set.

As in box 601B, training phase **1 alternative (1) continues by computer 201 performing computer-implemented method 601B to use this training set (leaf-annotated leaf-images 461) to train CNN 261 to separate leaf-images into single-leaf-images. Thereby CNN 261 turns into CNN 262. In other words, CNN 261 is "input" and CNN 262 is "output" of this method.

As in box 701A, training phase **1 alternative (1) continues by computer 301 receiving leaf-images 411 (from camera 311, optionally the same images as in 601A). In interaction with expert user 191, computer 301 receives annotations that indicate damage values on the leaves, for example, by damage percentages. It may be advantageous to let computer 301 receive images in that the leaf is already separated from the rest of the image, such as by receiving leaf-annotated leaf-images 461 or receiving leaf-images (output of CNN 262). Receiving the annotations leads to a plurality of damage-annotated leaf-images 471. This second plurality is the damage-estimation training set.

As in box 701B, training phase **1 alternative (1) continues by computer 201 performing computer-implemented method 701B to use damage-annotated leaf-images 471 to train CNN 271 to estimate damage values. Thereby CNN 271 turns into CNN 272. In other words, CNN 271 is "input" and CNN 272 is "output" of this method.

Testing Phase with Alternative (1)

As testing phase **2 leads to a damage degree for a particular leaf, the description uses words in singular for particular images, particular damage values, etc.

As in box 602A, testing phase **2 starts with computer 202 receiving (particular) leaf-image 412.

As in box 602B, computer 202 uses CNN 262 to process leaf-image 412 to derive a (particular) single-leaf-image 422 (i.e., a segmented leaf-image). Image 422 is a contiguous set of pixels that show main leaf 122-1 of (particular) plant 112 completely (cf. FIG. 2). In other words, image 422 shows the entire main leaf.

As in box 702B, computer 202 uses CNN 272 to process single-leaf-image 422 by regression to obtain a (particular) damage degree. The damage degree corresponds to the estimated values that the experts had annotated earlier in the training phase. Since the experts make their estimations by comparing damaged surfaces to healthy surfaces, the degree approximately corresponds to the surface ratio (surface of damage regions over leaf surface).

Training Phase with Alternative (2)

As in box 601A, training phase **1 alternative (2) also starts by computer 301 receiving leaf-images 411 (from camera 311), but alternative (2) does not apply sequence 601B. The computer performs segmentation to obtain single-leaf-images 421. The segmentation can be performed manually (with an expert cutting out the foreground leaf), but can also be performed by using sequence 602B. The figure illustrates this by dotted lines from box 601A to box 602B. In that case, training the CNN to perform separation has been performed earlier. The output would be single-leaf-images 421 (i.e., a plurality of images).

As in box 401, computer 201 processes single-leaf-images 421 by converting them to binary-images 431. With details to be explained in connection with FIG. 8 (COLOR TRANSFORMATION), binary-images 431 have pixels that represent damage and have pixels that represent the undamaged parts of the leaves (i.e., damage regions vs. no-damage regions).

As in box 701B, training phase **1 alternative (2) continues by computer 201 performing computer-implemented method 701B. Computer 201 receives image pairs with single-leaf-images 421 and with corresponding binary-images 431. The CNN now learns how to obtain the binary-images by multiple convolutions, but without performing color-transformation. Again, thereby CNN 271 turns into CNN 272. In other words, CNN 271 is "input" and CNN 272 is "output" of this method.

Testing Phase with Alternative (2)

As testing phase **2 leads to a damage degree for a particular leaf, the description again uses words in singular for particular images etc.

As in box 602A, testing phase 2 starts with computer 202 receiving (particular) leaf-image 412 and providing (particular) single-leaf-image 422**. There is no substantial difference to alternative (1), except that the computer obtains N_LEAF (i.e., the number of leaf-pixels) as well.

As in box 702B, computer 202 uses CNN 272 alternative (2) to process single-leaf-image 422 by damage-segmentation to obtain a (particular) binary-image 432. Since the binary-image uses different coding for damage regions and for no-damage regions on the leaf, the number of damage-pixels N_DAMAGE becomes available.

The computer calculates the damage degree as the ratio between the number of pixels (corresponding to damage) over (i.e., divided by) the number of pixels (corresponding to the leaf), that is

RATIO=$N\_DAMAGE/N\_LEAF$.

Accuracy

Optionally, computer 202 forwards the damage degree RATIO (both alternatives (1) and (2)) to field user 192 (cf. FIG. 2).

Field user 192 could obtain the damage degree also by sending plants (or leaves) to a laboratory in that experts visually inspect the leaves. The laboratory experts could use measurement tools (such as microscopes) to obtain data with relatively high accuracy. The duration of the laboratory approach contradicts accuracy: the laboratory delay (in terms of hours or days) would prevent efficient countermeasures. The result may arrive when the damage has spread over the plant as a whole and has destroyed the plant.

In contrast, the delay by electronically transmitting leaf-images 412 from the agricultural field to computer 202 (cf. network 342 in FIG. 2), processing the images by both CNNs 262/272 and by returning the damage degree is negligible. Ideally, the farmer makes the photo and sees the results within seconds. During that time, damage to the plants will not significantly change.

The damage degree RATIO is not as accurate as the ground truth from the laboratory, but the RATIO is sufficiently accurate for the farmer to identify (and quantify) the countermeasures accordingly.

User Involvement

In training phase 1, expert user 191 can have different roles. In the first role, user 191 knows exactly where the main leaves have their edges, and in the second role, user 191** estimates a damage degree.

Plant and Camera in Real-World Situations

A computer would quantify damage with highest accuracy if the images (both for training and for testing phases) would be taken under repeatable conditions with high-performance camera equipment. However, there is no need to visit a photographic studio for taking high-quality photos of selected well-shaped and healthy plants.

In contrast, user 192 in his or her role as camera operator takes the photos (i.e. the images) at locations that are typical for plants, such as in the field, in the green-house or the like, just on the working place.

Such a non-studio environment creates several constraints, such as the following:

The illumination (of plant 112 and/or the background) may not be optimized to have images that show details of the leaves. Leaf-images 412 may suffer from over-exposure or under-exposure. As the sun goes along its path, the illumination changes during the day.

The leaf-to-camera-distance may be unpredictable. The user holds the camera in his/her hand, but different users may take images at different distances.

The resolution is not necessarily a 24M or the like resolution of studio cameras, but can be smaller. For example, many cameras have options to set the image resolution to lower values (for example with option L for full resolution, options M and S for pixel-reduced resolutions)

Although some cameras use automatic focusing, there is no guarantee that all leaves are on focus. Unfocused images need to be expected.

Cameras (especially that of mobile devices, smartphones cf. device 302 in FIG. 2) may adjust camera settings and image processing to optimize image of persons, but the camera are not fine-tune for taking leaf-images.

Cameras are usually not mounted on a tripod or the like. Shaking is expected.

The leaves may oscillate in the air.

The leaves may contain other elements that are different from the damage regions. Such elements are, for example, insects, water drops, soil particles, or holes.

Leaf Segmentation

Figure 4:
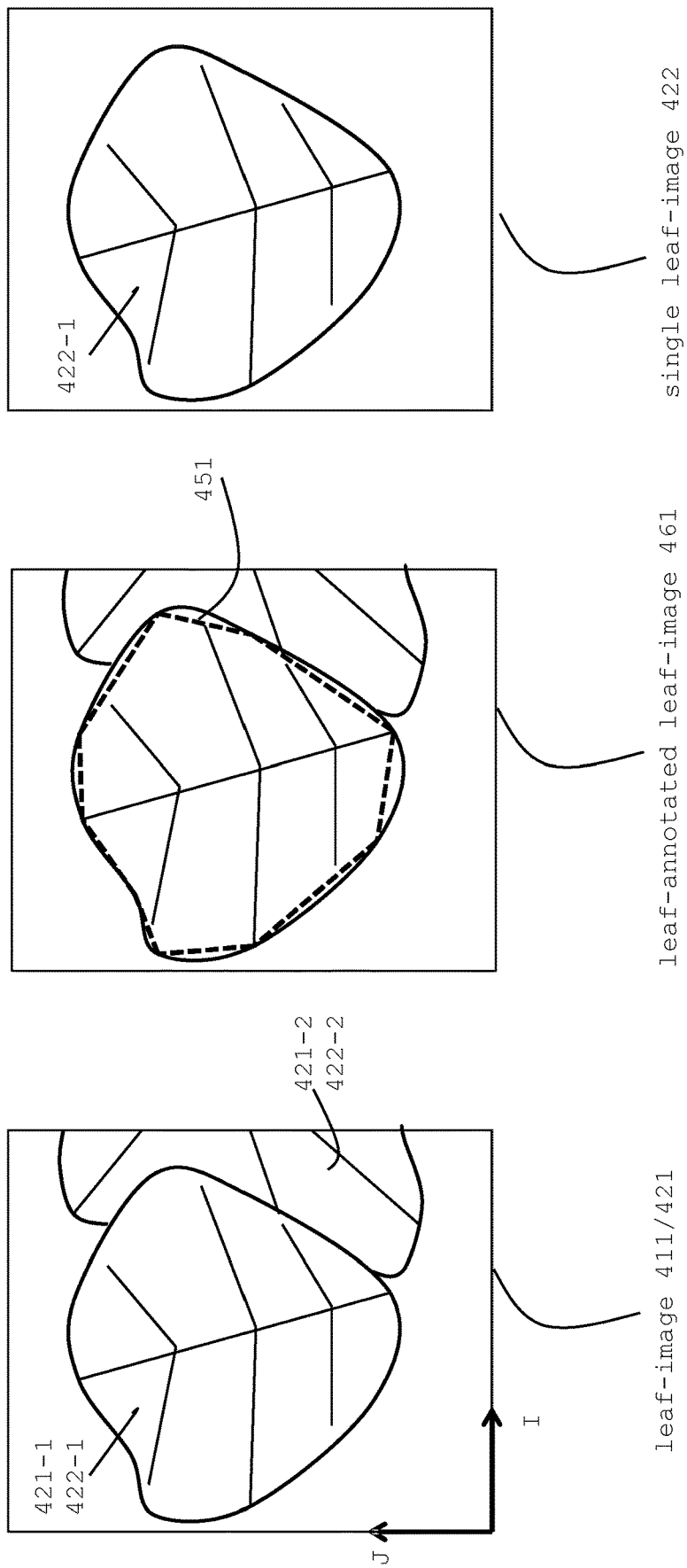
FIG. 4 illustrate a leaf-image, a leaf-annotated leaf-image and single-leaf-image.

FIG. 4 illustrate leaf-image 411/412, leaf-annotated leaf-image 461 and leaf-image 421/422. The 1/2 notation indicates the applicability to the phases. The pixel coordinates are (I, J).

In both phases 1 and 2, the camera operators (e.g., users 191/192) direct camera 311/312 to plant 111/112 such that leaf-images 411/412 are images with the major share of the pixels showing at least one leaf completely (i.e., such as leaf-image shows at least one entire leaf with all edges). It is advantageous if the main leaf is represented by 50% or more of the pixels of the leaf-image.

Since the leaves of the plants overlap with each other, leaf-image 411/412 therefore shows main leaf 421-1/421-2 in the foreground (i.e., foreground leaf/leaves) and shows other leaf 421-2/422-2 (or background leaf/leaves) in the background. In the example, image 411/412 shows main leaf 421-1/422-1 as the complete leaf (i.e., entire leaf), and shows adjacent leaf 421-2/422-2 only partially (due to overlap).

For simplicity, the figure illustrates leaf-images 411/412 for an ideal plant without damage, but damage could occur on all leaves. Since the damage-value is a per-leaf value, the main leaf is separated.

In training phase 1, leaf-images 411 are input images to computer 301, and in testing phase 2, leaf-images 412 are input images to CNN 262 of computer 202.

Leaf-annotated leaf-image 461 has been annotated by expert user 191 (alternative (1) only). The leaf-annotation identifies the leaf border (or leaf edge) of the main leaf 421-1 in difference to adjacent leaf 421-2 and in difference to the background (also to the soil, if visible on the image). In implementations, user 191 can draw polygon 451 (dashed line) around that part of leaf-image 411 that shows the complete leaf (i.e., the main leaf). cf. FIG. 5. It is convenient to display polygon 451 to expert user 191, but this is not required. Computer 301 can close polygon 451 automatically.

Instead of polygons, the person of skill in the art can use other user interfaces, for example picture processing tools to manipulate images, for example, by "erasing" the pixels surrounding the main leaf or otherwise.

The leaf-annotation allows computer 201 (cf. FIG. 1) for each pixel of leaf-image 411 to differentiate if the pixel belongs to the main leaf or not. This differentiation is relevant for performing method 601B (cf. FIG. 3, leaf segmentation).

The leaf-annotation allows the CNN being trained to differentiate image regions that show two types of "borders": between leaf and leaf, and between leaf and background (such as soil). Once trained, the CNN can but the leaf along such borders. In other words, the borders (or margins) stand for a cutting line.

For the leaf-annotation, it does not matter if the leaf shows damage or not.

Leaf-image 421 is the output of CNN 271 performing the segmentation and shows the main leaf only. The pixels outside of the leaf are to be ignored for processing (by CNN 272).

Damage (on Leaves)

Having described the segmentation of the main leaf from the plant, both for plants in real life, and for the images, the description now discusses damage that occurs on the leaves.

Figure 5:
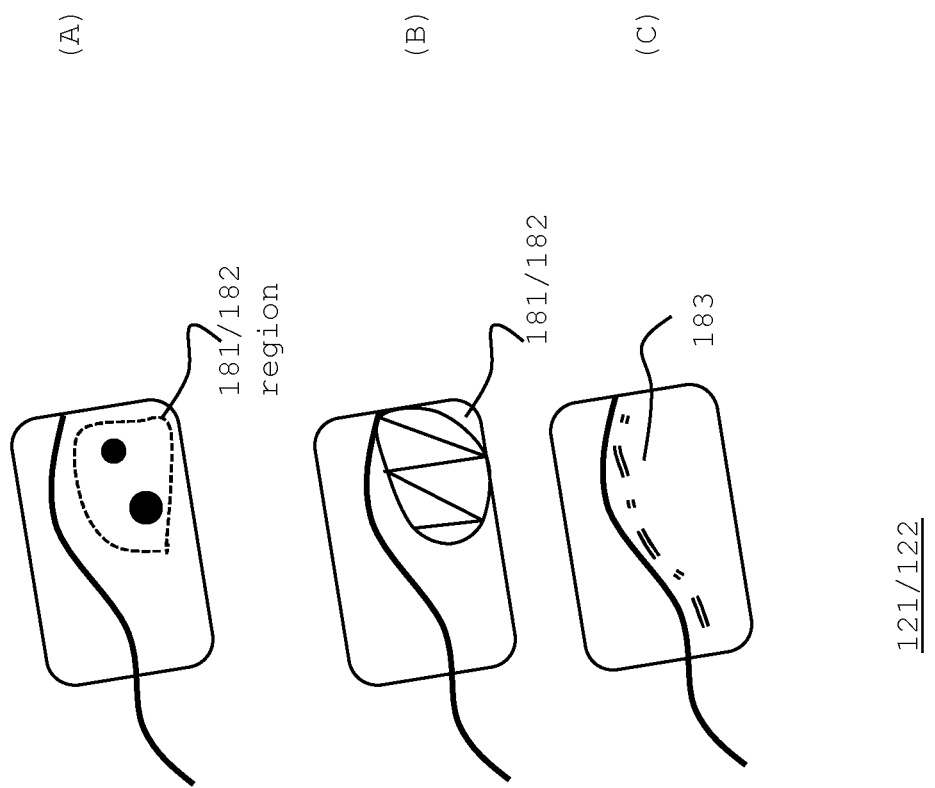
FIG. 5 illustrates damage on a leaf by way of example, with the leaf being a main leaf or foreground leaf of the plant.

FIG. 5 illustrates damage on leaf 121/122 by way of example. Leaf 121/122 is the foreground or main leaf (cf. FIG. 4). For simplicity, this leaf is illustrated by a round-shaped rectangle. Bold lines symbolize folds and nerves (of the leaf). The figure has versions (A), (B) and (C).

Damage is visible on the surface of the leaf, as dot-shaped variations on the surface color of the leaf. Much simplified, a leaf without damage has a surface that is substantially "green" everywhere, a leaf with damage has a surface that is still "green", but that shows "no-green" spots (or dots).

In the simplified example of FIG. 5 version (A), leaf 121/122 is a damaged leaf with two damage dots. To symbolize size variations, both dots are illustrated by different sizes. In reality, most of the dots are not necessarily black (as in the figure), but rather in a "no-green" color. Damage region 181/182 can be a cluster of dots (is a region on the leaf that has a relatively high concentration of damage dots)

Reasons for the damage include feeding damage (insects have eaten part of the leaf, potentially the insects are still sitting on the leaf), disease damage, and others. Different reasons lead to different types of damage.

Leaves and damage regions have areas (measured, for example, in square millimeters or square centimeters). To quantify damage, areas with damage can be related to the overall surface area of the leaf:

RATIO=AREA_DAMAGE/AREA_LEAF

FIG. 5 (C) illustrates the leaf again, but with shadow 183. The shadow is NOT a damage. Such shadows (or occlusions etc.) occur according to the relative directions between light and (optical axis of) camera.

The description will now explain how computer 202 processes images to identify pixels that show damage. Calculating the RATIO by relating pixel numbers leads to the damage degree.

Annotating Damage in Alternative (1)

Figure 6:
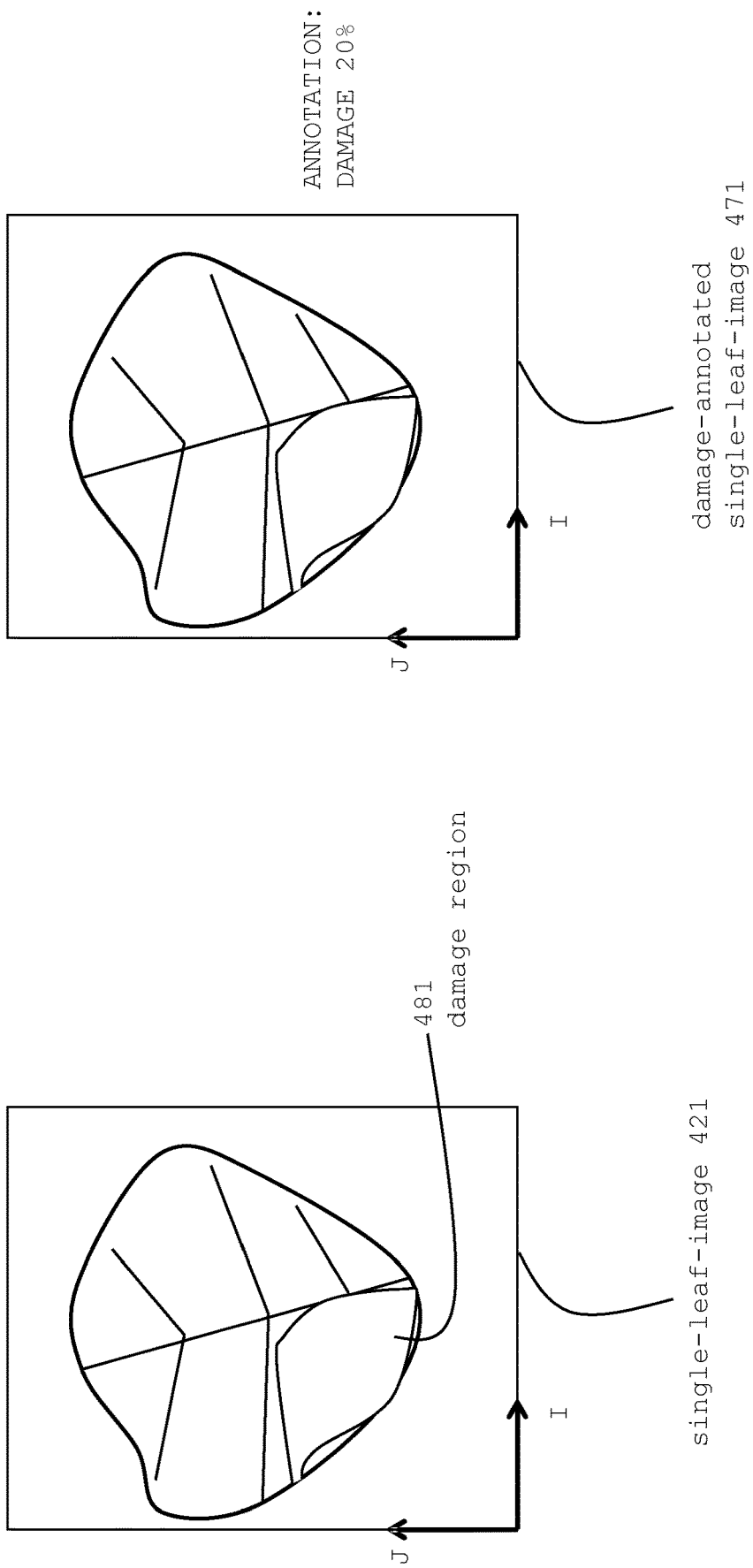
FIG. 6 illustrates a single-leaf-image with a damage region, and illustrates a damage-annotated leaf-image (first alternative)

FIG. 6 illustrates leaf-image 421 with damage region 481 on the left side, and illustrates damage-annotated leaf-image 471 on the right side. FIG. 6 corresponds to box 601A in FIG. 3. Single-leaf-image 421 can be obtained by operating CNN 262, or can be leaf-image 411 that is being annotated (cf. FIG. 4). Annotating images to obtain the damage-estimation training set comprises the assignment of visually estimated damage.

In training phase **1, expert user 191 inspects leaf-image 421 and estimates the area percentages. Damage region 481 extends over AREA_DAMAGE and the leaf extends over AREA_LEAF. The ratio AREA_DAMAGE/AREA_LEAF is the annotation value (i.e., the metadata in image 471).

In the example, approximately 20% of the leaf surface shows damage. There is no need to count pixels.

As mentioned already, annotations are obtained for pluralities of leaves (damage-estimation training set).

Variations of the approach are possible. For example, expert user 191 does not have to look at an image. He or she can look at the leaf directly, and can enter the estimation into computer 301 directly. (This is different from annotating leaf edges as in FIG. 5, the damage value may be just a single numeric value).

Also, the expert user 191 could annotate the damage area by polygons or the like (similar as the leaf edge) and the computer could calculate the damage ratio by relating the areas obtained by the annotations (cf. annotation 451 for the leaf).

Quantity Indicators for the Damage on the Leaves (or Plants)

Damage is quantified by damage degrees (or damage quantity indicators). The pixel in leaf-image 422-2 (cf. FIG. 4) can be differentiated into pixels that correspond to damage pixels that correspond to the leaf (with or without damage)

pixels that are ignored

Computer with CNN 272 (alternative (2)) can count the pixels (N) separately for damage-pixels, and for leaf-pixels. Obtaining the damage degree can follow RATIO=N_DAMAGE/N_LEAF (or other modified formulas).

In other words, damage corresponds to the share of a damaged area over the overall surface of the leaf. The ratios are conveniently given as percentages.

Shortly returning to FIG. 2, the RATIO can be returned to camera operator 192 (in the function of being the farmer). For the farmer it can make a difference to understand, for example, that a particular plant shows a damage of 50% or 20%.

The person of skill in the art can calculate the RATIO by different formulas (e.g., N_DAMAGE/N_NO_DAMAGE, with N_DAMAGE+N_NO_DAMAGE=N_LEAF)

Further, damage dots are countable. In the simplified example there are just N=2 dots (FIG. 5, in region 181), but in reality there can be hundreds of dots in a single region (or on a single leaf). Damage regions are countable as well. In the example, there is a single region only. But regions are also measurable by their surface areas. It is convenient to measure the damage region in relation to the overall surface of the leaf. In the example of FIG. 6, region 481 occupies approximately a quarter of the surface area. Damage may not appear as countable dots, but rather as relatively large regions (with different colors).

Front/Back

While the figures illustrate the leave with the front sides, it is noted that damage can also occur on the back sides of the leaves. The computer that processes the images does not necessarily have a priori data that differentiates the front side from the backside.

On the front side, the contrast between the "green" of the leaf and the "other color" of the damage is usually higher than on the back side.

During training **2, sequence 601A (receiving leaf-images 411) is performed with images showing the front side and with images showing the back side.

CNN Layers

Figure 7:
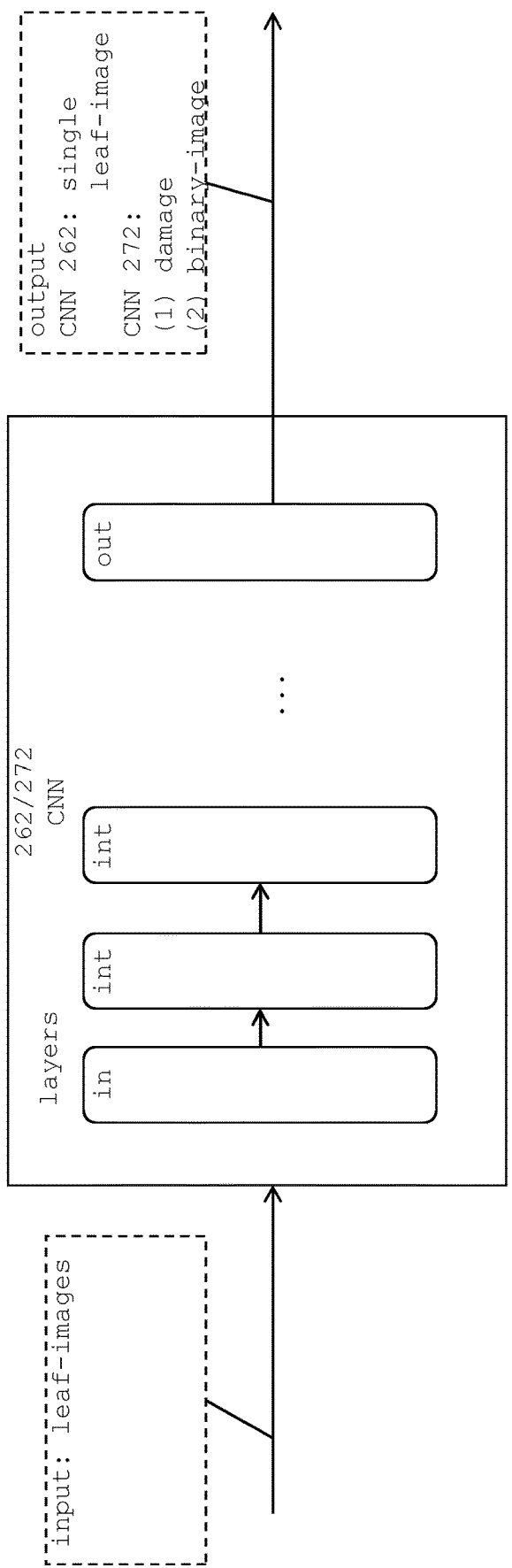
FIG. 7 illustrates CNNs with layers, in a general overview.
Figure 8:
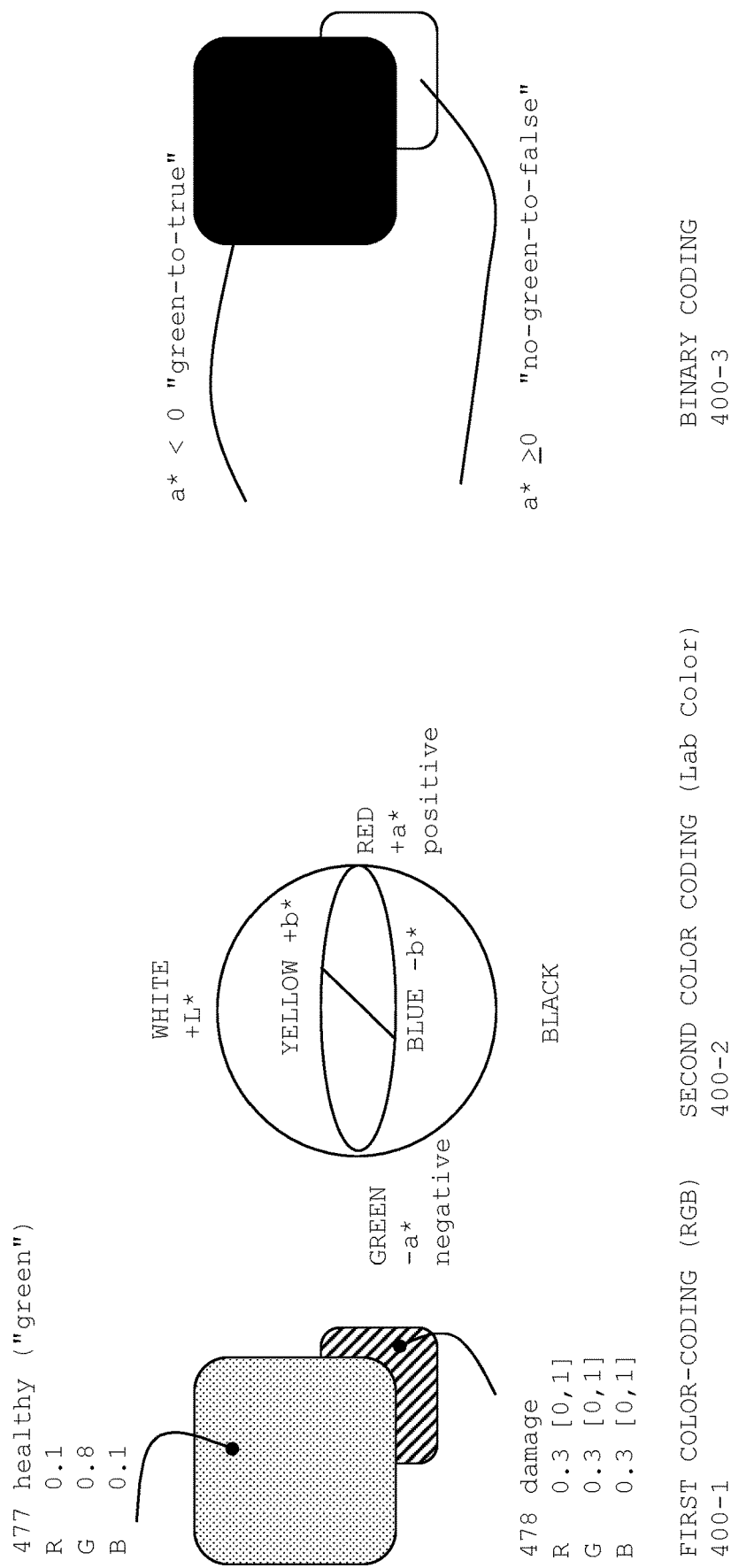
FIG. 8 illustrates color transformation (as an auxiliary process for the second alternative) with an image having pixels in two colors and with the assignment of color-coded pixels to binary values.

FIG. 7 illustrates CNNs 261/262/271/272 with layers, in a general overview. The CNNs are implemented by collections of program routines being executed by a computer such as by computer 201/202. FIG. 7 illustrates the CNNs with the input to an input layer and with the output from an output layer. FIG. 7 also illustrates (at least symbolically) intermediate layers. CNNs 261/262/271/272 are deep neural networks because they have multiple intermediate layers. The intermediate layers are hidden. In other words, deep learning is applied here.

FIG. 7 also illustrates some parameters. Since CNNs are well known in the art, the description focuses on the parameters that are applied specially for segmenting by CNNs 261/262 and for estimating the damage by CNNs 271/272.

In training phase **1, CNNs 261/271 receive annotated images 461, 471 and turn un-trained CNN 261 into trained CNN 262 (using the leaf-annotated leaf-images) and turn un-trained CNN 271 into trained CNN 272 (using damage-annotated leaf-images).

In the testing phase, CNNs 262 and 272 receive leaf-image 412 and provide output as the damage quantity indicator. For example, the indicator can be the RATIO (alternative (1)). Or, as in alternative (2), the output is binary-images 432 with N_DAMAGE, and the RATIO can be calculated (because N_LEAF is known).

Network Types

Networks are publicly available in a variety of implementations, and the networks are configured by configuration parameters.

The description shortly refers to input/output parameters in general as well as to configuration parameter and then specifies parameters. Occasionally, an existing network is being modified.

Exemplary networks comprise the following network types (or "architectures"):

The UNet type is disclosed by Ronneberger, O., Fischer, P., Brox, T., 2015. U-net: Convolutional networks for biomedical image segmentation, in: Lecture Notes in Computer Science (Including Subseries Lecture Notes in Artificial Intelligence and Lecture Notes in Bioinformatics). pp. 234-241. doi:10.1007/978-3-319-24574-4_28

The DenseNet type is disclosed by Huang, G., Liu, Z., Van Der Maaten, L., Weinberger, K. Q., 2017. Densely connected convolutional networks, in: Proceedings—30th IEEE Conference on Computer Vision and Pattern Recognition, CVPR 2017. pp. 2261-2269. doi:10.1109/CVPR.2017.243

The CNNs have the following properties:

It can be a fully convolutional model (as for DenseNet), being able to provide semantic segmentation (i.e. leaf segmentation, damage segmentation).

The difference is the loss function. Regression is known in the art.

The CNN for leaf segmentation has been tested for implementations for the types UNet and DenseNet.

In implementations, CNN 261/262 is a CNN of the DenseNet type. For this purpose, the following implementation parameters are convenient:

The loss function can be a "binary_crossentropy" function.

The activation of the last layer can use a "softmax" function.

The dimensions of the input and output image can be 224×224 pixels.

For alternative (1)—regression—CNN 271/272 may be based on ResNet18 (He, K., Zhang, X., Ren, S., Sun, J., 2015. Deep Residual Learning for Image Recognition. doi:10.1109/CVPR.2016.90, published for the 2016 IEEE Conference on Computer Vision and Pattern Recognition (CVPR), 27-30 Jun. 2016). In other words, the CNN has a layer structure as disclosed in the paper, but has been trained as described herein. Since 2015, other ResNet versions become available in follow-up papers, and the person of skill in the art can use newer versions as well.

A residual neural network (ResNet) is an artificial neural network (ANN) that builds on constructs known from pyramidal cells in the cerebral cortex. Residual neural networks do this by utilizing skip connections, or shortcuts to jump over some layers. Typical ResNet models are implemented with double- or triple-layer skips that contain nonlinearities (ReLU) and batch normalization in between.

For alternative (2)—damage segmentation—CNN 271/272 is based on the DenseNet type.

Image Processing in the Second Alternative

The description now discusses the color transformation (cf. 401) that is an auxiliary process.

As the camera provides images as color images (usually in RGB color space), the images keep the color through processing. The description now explains how color processing (transforming the color space and filtering) can adapt the images to have their content more suitable for the CNNs.

Computer-implemented image processing can take advantage of the following observations (regarding the plant):

Damage on leaves changes the color of the leaf (cf. FIG. 5), but this color change is not uniform for the plant as a whole.

Leaf-images may show leaves on the background, with the colors being different (e.g., "green" leaf over "no-green" background).

Leaf-images show "green" leaf pixels and "no-green" damage pixels in different colors.

In such situations, the differences can be binary differences (TRUE/FALSE, GREEN/NO-GREEN etc.). Enhancing the color contrast in images would make such differences more visible to human viewers. However, the images are not necessarily being displayed to human users (except some annotating interactions, cf. 451 in FIG. 4).

FIG. 8 illustrates color transformation 401 (cf. FIG. 3) with an image having pixels in two colors and with the assignment of color-coded pixels to binary values In RGB-coding (i.e., the original coding of the images), each pixel is coded by a triplet of numbers (e.g., real numbers in the closed interval [0; 1], or integer numbers over a different numeric range). For example, a pixel in ideal green would be (R, G, B) coded as (0, 1, 0).

The example of FIG. 8 illustrates no-damage region 477 (or healthy region) in, for example "green" (0.1, 0.8, 0.1) and illustrates damage region 478 in, for example "white" (0.3, 0.3, 0.3). The RGB-coding is an example for first color-coding 400-1.

The biological color "green" is not ideal as (0, 1, 0) and not ideal as in the example. In the plant- or leaf-images, the "green" pixels are coded by a mixed of different components that even vary from pixel to pixel. Artefacts (cf. the shadows) would add a further variation in the coding.

To differentiate colors, the computer would have to apply multi-dimensional operations. The RGB-color-space is a 3D space, and any threshold that separates color in two (binary)

groups would be 2D plane in that space. The implementation would be computational intensive.

Color transformation provides a solution to this constraint. The image is transformed to second color-coding 400-2 in the so-called L*a*b* color space. This space is also referred to as CIELAB. To implement such color space transformation, the person of skill in the art can use libraries with computer instructions for image transforming. Such libraries are available for example, in Matlab (mathworks.com), skimage (scikit-image.org), openCV (opencv.org), etc. In the embodiments, transformation was implemented by skimage for python.

Color-coding is well-known in the art, and the L*a*b* space is standardized by the CIE (Commission Internationale de l'Éclairage, International Commission on Illumination, ISO/CIE 11664-4:2019 Colorimetry). In short, the color components define WHITE, BLACK, YELLOW, BLUE, RED and GREEN. The component a* indicates GREEN (if negative) and indicates RED (if zero, or positive).

Since for many plants, "green" is the dominant plant color, the use of "green" is convenient for illustrations. As a side-note, reducing the computation effort may reduce the waiting time by that the farmer of FIG. 2 waits for the damage degree to be displayed (saving computation time).

In the color transformation cited by FIG. 8, the assignment of the color-coded pixels to binary coding 400-3 depends on the component a*, with "green-to-true" (for a*<0) and "no-green-to-false" (for a*>0). The assignment is arbitrary and the illustration in black for TRUE and white for FALSE is used for illustration. The names of the binary values "(no)-green . . . " do not matter.

Using the component a* (of CIELAB) as the color differentiator is advantageous as explained in the following. There is no need for a 2D differentiation any longer.

The person of skill in the art can apply other color transformations likewise (such as RGB to XYZ, standardized by CIE as well).

In general, the transformation is selected such that one of the components (in the second color-coding) has its maximal variation from the colors to be differentiated. In the example of FIG. 8, the "green" color is coded by a* that eventually changes its sign. In this case, the sign change is the maximal variation. It is noted that a CNN may learn more efficiently when signs change.

In another example, a particular code component would have its maximal variation by a change from "0" to "1".

By a simple operation (a comparison for substantially each pixel), the computer can classify each pixel to binary values to obtain an image in binary-coding 400-3. In the example the binary values are called "green-to-true" or "no-green-to-false". But again the naming does not matter.

FIG. 9 illustrates that the computer changes the color-coding of single-leaf-image 421 and arrives at binary-image 431. In the example, single-leaf-image 421 has 5 damage regions. Binary-image 431 shows the no-damage regions in a first binary code, such as "green-to-true" (illustrated in black) and shows the damage regions in a second binary code, such as "no-green-to-false" (illustrated in white).

During training phase **1, color-changing is performed for a plurality of single-leaf-images, such as for 1000 images.

Color-changing may not detect damage regions in some situations, but CNNs may detect damage regions in more situations. The fact of providing many "weak" examples (during training) to the CNNs forces them to learn what damage is. During the testing phase, the CNN can then be capable of detecting damaged regions at higher accuracy.

Two Exemplary Usage Scenarios

The approach (i.e., sequences 601B, 602B, 701B, 702B cf. FIG. 3) is applicable to at least two experimental scenarios of different damage-cause and damaged-plant combinations.

In the first scenario, plant 112 is an eggplant, and the damage is feeding damage by thrips (FRANOC). In the first scenario, damage is expected on both side of the leaf (front and back).

In the second scenario, plant 112 is a tomato, and the damage is feeding damage by tuta (GNORAB).

The uppercase acronyms are the so-called EPPO-codes (European and Mediterranean Plant Protection Organization). The scenarios are just examples, the approach could be applied to other crops with leaves as well.

Real Images

FIG. 10 illustrates several gray-scale photographs with real images of eggplants. The figure illustrates the images together with reference numbers.

Leaf-image 411/412 (i.e. before segmentation) is illustrated even with the hand of the camera operator. Single-leaf-image 421/422 is the leaf-image (e.g., after segmentation). The background in "black" just indicates that background pixels do not convey information. These images are applicable to both training phase 1 and testing phase 2. Images 411/412 show a leaf with small low-contrast dots, almost as for a healthy leaf.

The next images show an example with damage, belonging to alternative (2) in training phase **1.

Single-leaf-image 421 shows damage region 481 (cf. the arrow) and shows the rest of the leaf without damage.

Binary-image 431 has been derived from image 421 by color-processing as described. The color of the damage has been assigned to WHITE. In other words, image 421/431 is an image pair.

Binary-image 431 has been derived from image 421.

During testing phase **2, single-leaf-image 421 would be the input to CNN 272 alternative (2) and binary-image 432 would be the output. The RATIO can be calculated, because (i) the number of the WHITE pixels is derivable from binary-image 432 and (ii) the number of the pixels in the leaf is derivable from image 422.

Computer System

Figure 11:
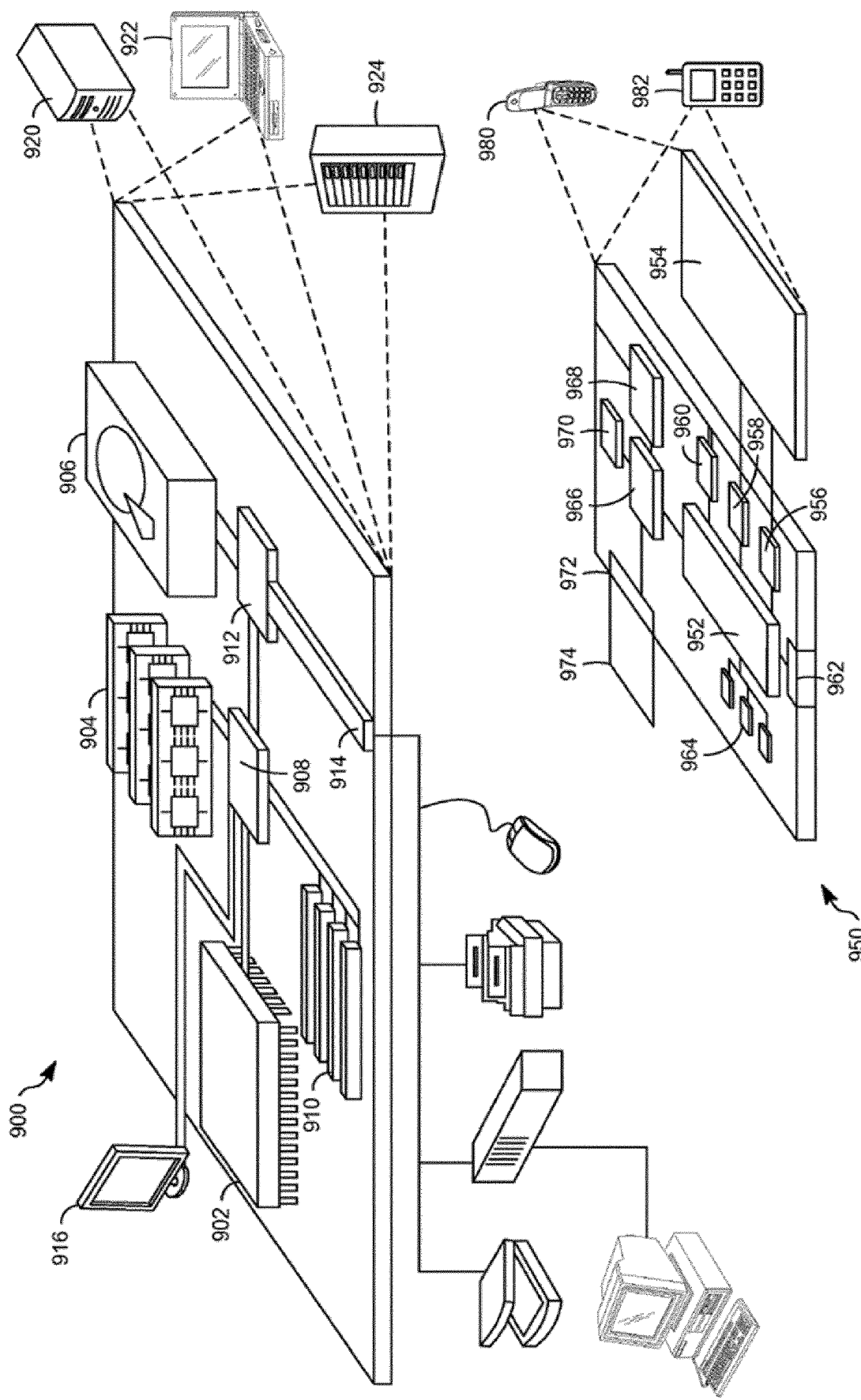
FIG. 11 illustrates an example of a generic computer device and a generic mobile computer device.

FIG. 11 illustrates an example of a generic computer device 900 and a generic mobile computer device 950, which may be used with the techniques described here. Computing device 900 is intended to represent various forms of digital computers, such as laptops, desktops, workstations, personal digital assistants, servers, blade servers, mainframes, and other appropriate computers. Generic computer device may 900 correspond to computers 201/202 of FIGS. 1-2. Computing device 950 is intended to represent various forms of mobile devices, such as personal digital assistants, cellular telephones, smart phones, and other similar computing devices. For example, computing device 950 may include the data storage components and/or processing components of devices as shown in FIG. 1. The components shown here, their connections and relationships, and their functions, are meant to be exemplary only, and are not meant to limit implementations of the inventions described and/or claimed in this document.

Computing device 900 includes a processor 902, memory 904, a storage device 906, a high-speed interface 908 connecting to memory 904 and high-speed expansion ports 910, and a low speed interface 912 connecting to low speed bus 914 and storage device 906. Each of the components 902, 904, 906, 908, 910, and 912, are interconnected using various busses, and may be mounted on a common motherboard or in other manners as appropriate. The processor 902 can process instructions for execution within the computing device 900, including instructions stored in the memory 904 or on the storage device 906 to display graphical information for a GUI on an external input/output device, such as display 916 coupled to high speed interface 908. In other implementations, multiple processors and/or multiple buses may be used, as appropriate, along with multiple memories and types of memory. Also, multiple computing devices 900 may be connected, with each device providing portions of the necessary operations (e.g., as a server bank, a group of blade servers, or a multi-processor system).

The memory 904 stores information within the computing device 900. In one implementation, the memory 904 is a volatile memory unit or units. In another implementation, the memory 904 is a non-volatile memory unit or units. The memory 904 may also be another form of computer-readable medium, such as a magnetic or optical disk.

The storage device 906 is capable of providing mass storage for the computing device 900. In one implementation, the storage device 906 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 904, the storage device 906, or memory on processor 902.

The high speed controller 908 manages bandwidth-intensive operations for the computing device 900, while the low speed controller 912 manages lower bandwidth-intensive operations. Such allocation of functions is exemplary only. In one implementation, the high-speed controller 908 is coupled to memory 904, display 916 (e.g., through a graphics processor or accelerator), and to high-speed expansion ports 910, which may accept various expansion cards (not shown). In the implementation, low-speed controller 912 is coupled to storage device 906 and low-speed expansion port 914. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 900 may be implemented in a number of different forms, as shown in the figure. For example, it may be implemented as a standard server 920, or multiple times in a group of such servers. It may also be implemented as part of a rack server system 924. In addition, it may be implemented in a personal computer such as a laptop computer 922. Alternatively, components from computing device 900 may be combined with other components in a mobile device (not shown), such as device 950. Each of such devices may contain one or more of computing device 900, 950, and an entire system may be made up of multiple computing devices 900, 950 communicating with each other.

Computing device 950 includes a processor 952, memory 964, an input/output device such as a display 954, a communication interface 966, and a transceiver 968, among other components. The device 950 may also be provided with a storage device, such as a microdrive or other device, to provide additional storage. Each of the components 950, 952, 964, 954, 966, and 968, are interconnected using various buses, and several of the components may be mounted on a common motherboard or in other manners as appropriate.

The processor 952 can execute instructions within the computing device 950, including instructions stored in the memory 964. The processor may be implemented as a chipset of chips that include separate and multiple analog and digital processors. The processor may provide, for example, for coordination of the other components of the device 950, such as control of user interfaces, applications run by device 950, and wireless communication by device 950.

Processor 952 may communicate with a user through control interface 958 and display interface 956 coupled to a display 954. The display 954 may be, for example, a TFT LCD (Thin-Film-Transistor Liquid Crystal Display) or an OLED (Organic Light Emitting Diode) display, or other appropriate display technology. The display interface 956 may comprise appropriate circuitry for driving the display 954 to present graphical and other information to a user. The control interface 958 may receive commands from a user and convert them for submission to the processor 952. In addition, an external interface 962 may be provide in communication with processor 952, so as to enable near area communication of device 950 with other devices. External interface 962 may provide, for example, for wired communication in some implementations, or for wireless communication in other implementations, and multiple interfaces may also be used.

The memory 964 stores information within the computing device 950. The memory 964 can be implemented as one or more of a computer-readable medium or media, a volatile memory unit or units, or a non-volatile memory unit or units. Expansion memory 984 may also be provided and connected to device 950 through expansion interface 982, which may include, for example, a SIMM (Single In Line Memory Module) card interface. Such expansion memory 984 may provide extra storage space for device 950, or may also store applications or other information for device 950. Specifically, expansion memory 984 may include instructions to carry out or supplement the processes described above, and may include secure information also. Thus, for example, expansion memory 984 may act as a security module for device 950, and may be programmed with instructions that permit secure use of device 950. In addition, secure applications may be provided via the SIMM cards, along with additional information, such as placing the identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 964, expansion memory 984, or memory on processor 952, that may be received, for example, over transceiver 968 or external interface 962.

Device 950 may communicate wirelessly through communication interface 966, which may include digital signal processing circuitry where necessary. Communication interface 966 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 968. In addition, short-range communication may occur, such as using a Bluetooth, WiFi, or other such transceiver (not shown). In addition, GPS (Global Positioning System) receiver module 980 may provide additional navigation- and location-related wireless data to device 950, which may be used as appropriate by applications running on device 950.

Device 950 may also communicate audibly using audio codec 960, which may receive spoken information from a user and convert it to usable digital information. Audio codec 960 may likewise generate audible sound for a user, such as through a speaker, e.g., in a handset of device 950. Such sound may include sound from voice telephone calls, may include recorded sound (e.g., voice messages, music files, etc.) and may also include sound generated by applications operating on device 950.

The computing device 950 may be implemented in a number of different forms, as shown in the figure. For example, it may be implemented as a cellular telephone 980. It may also be implemented as part of a smart phone 982, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing device that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing device can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

REFERENCES

111, 112 plant
221, 122 leaf
181, 182 damage
183 shadow
191, 192 user
201, 202 computer
301 computer
311, 312 camera
342 network
392 user interface
401 color transformation
400-1 first color-coding
400-2 second color-coding
400-3 binary coding
411/412 leaf-image
421-1,422-1 main leaf
421-2, 422-2 adjacent leaf
422 leaf-image
451 annotation by polygon
461 leaf-annotated leaf-image
471 damage-annotated leaf-image
477, 478 no-damage/damage regions
481, 482 damage region
261, 262 CNN (segmentation)
271, 272 CNN (damage estimation)
601A, 602AB step sequences
701AB, 702B step sequences
9xx computer system, with components

The invention claimed is:

1. A computer-implemented method to quantify biotic damage in leaves of crop plants, the method comprising:
receiving a leaf-image taken from a particular crop plant, the leaf-image showing at least one of the leaves of the particular crop plant;
using a first convolutional neural network to process the leaf-image to derive a segmented leaf-image, the segmented leaf-image hereinafter referred to as the singleleaf-image, being a contiguous set of pixels that show an entire foreground leaf of the particular plant, the first convolutional neural network having been trained by a plurality of leaf-annotated leaf-images, wherein the leaf-images in a training set are annotated to identify foreground leaves, with the leaf-annotation identifying a leaf border of the foreground leaves in difference to adjacent leaves and in difference to a background; and using a second convolutional neural network to process the single-leaf-image to obtain a damage degree, wherein the damage degree is a regression output of the second convolutional neural network and represents a ratio of a surface area of damage regions of the foreground leaf to a total surface area of the foreground leaf.

2. The method according to claim 1, wherein the leaf-image is an image in that a major share of the pixels shows at least one entire leaf of the plant.

3. The method according to claim 1, wherein using the second convolutional neural network to process the single-leaf-image to obtain the damage degree, is performed by regression.

4. The method according to claim 3, wherein the second convolutional neural network is of a ResNet type.

5. The method according to claim 4, wherein the second convolutional neural network has been trained by a plurality of damage-annotated single-leaf-images, with the annotations being numeric values that correspond to the damage.

6. The method according to claim 1, wherein using the second convolutional neural network to process the single-leaf-image to obtain the damage degree, is performed by processing single-leaf-images and converting them to binary-images.

7. The method according to claim 6, wherein the second convolutional neural network is of a DENSENET type.

8. The method according to claim 7, wherein the damage degree is calculated as the ratio between a number of pixels corresponding to damage in a binary-image, over the number of pixels corresponding to the leaf in the single-leaf-image.

9. The method according to claim 8, wherein the second convolutional neural network has been trained by images obtained by converting a plurality of single-leaf-images from a first color-coding to a second color-coding, wherein the second color-code has single color component that differentiates the color of healthy regions over the color of damage regions, and by assigning binary values to pixels of the binary-image according to a magnitude of the single color component.

10. The method according to claim 9, wherein the first color-coding is RGB, the second color-coding is coding in a L*a*b* color space, wherein the single color component is a a* component.

11. The method according to claim 10, wherein the single color component is the magnitude of the component a* that is differentiated between being negative for healthy regions and being non-negative for damage regions.

12. A non-transitory computer-readable storage medium comprising instructions which, when executed by a computer, cause the computer to carry out the computer-implemented method according to claim 1.

13. A data processing system comprising one or more processors configured to perform the method according to claim 1.

14. The method according to claim 1, wherein the method further comprises storing the segmented leaf-image and the calculated damage degree in a database associated with the particular crop plant.

15. The method according to claim 1, wherein the leaf-image is pre-processed by applying a color normalization algorithm prior to processing by the first convolutional neural network.

16. The method according to claim 1, wherein the first convolutional neural network is configured to output a confidence score associated with the segmentation of the foreground leaf.

17. The method according to claim 1, wherein the segmented leaf-image is further processed to remove image artifacts or noise using a morphological filtering operation prior to processing by the second convolutional neural network.

18. The method according to claim 1, wherein the second convolutional neural network is trained to distinguish between biotic and abiotic damage regions on the leaf.

19. The method according to claim 1, wherein the method further comprises generating a visual overlay on the original leaf-image to highlight detected damage regions.

20. A computer-implemented method to quantify biotic damage in leaves of crop plants, the method comprising:
    receiving a leaf-image taken from a particular crop plant, the leaf-image showing at least one of the leaves of the particular crop plant;
    using a first convolutional neural network to process the leaf-image to derive a segmented leaf-image, the segmented leaf-image hereinafter referred to as a single-leaf-image, being a contiguous set of pixels that show an entire foreground leaf of the particular plant, the first convolutional neural network having been trained by a plurality of leaf-annotated leaf-images, wherein the leaf-images in a training set are annotated to identify foreground leaves, with the leaf-annotation identifying a leaf border of foreground leaves in difference to adjacent leaves and in difference to the background; and
    using a second convolutional neural network of a DENSENET type to process the single-leaf-image to obtain a damage degree, being a ratio of a surface area of damage regions over the surface area of the foreground leaf, performed by processing single-leaf-images and converting them to binary-images, wherein the damage is a regression output of the second convolutional neural network and represents a ratio between a number of pixels of the surface area corresponding to damage in a binary-image of the foreground leaf over the number of pixels corresponding to a total surface area of the leaf in the single-leaf-image.

* * * * *